US010877519B2

(12) United States Patent
Lin et al.

(10) Patent No.: US 10,877,519 B2
(45) Date of Patent: Dec. 29, 2020

(54) ELECTRONIC DEVICE AND METHOD FOR MANUFACTURING THE SAME

(71) Applicant: Chiun Mai Communication Systems, Inc., New Taipei (TW)

(72) Inventors: Yi-Ching Lin, New Taipei (TW); Ting-Chu Lee, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 16/274,226

(22) Filed: Feb. 12, 2019

(65) Prior Publication Data

US 2019/0258294 A1 Aug. 22, 2019

(30) Foreign Application Priority Data

Feb. 13, 2018 (CN) .......................... 2018 1 0150275

(51) Int. Cl.
G06F 1/16 (2006.01)
H05K 5/00 (2006.01)
H05K 7/00 (2006.01)
H01M 2/10 (2006.01)
H04M 1/02 (2006.01)

(52) U.S. Cl.
CPC ........ G06F 1/1637 (2013.01); H01M 2/1022 (2013.01); H04M 1/02 (2013.01); H05K 5/0017 (2013.01)

(58) Field of Classification Search
CPC .. G06F 1/1633; G06F 1/1637; H01M 2/1022; H04M 1/02; H05K 5/0017
See application file for complete search history.

(56) References Cited

U.S. PATENT DOCUMENTS

| 6,800,373 | B2 * | 10/2004 | Gorczyca | C08G 59/4284 |
| | | | | 257/687 |
| 9,726,402 | B2 * | 8/2017 | Chandra | F24S 70/30 |
| 9,989,995 | B2 * | 6/2018 | Kwak | G06F 1/1643 |
| 10,203,724 | B2 * | 2/2019 | Yoon | G06F 1/1633 |
| 10,488,888 | B2 * | 11/2019 | Raff | G06F 1/1652 |
| 2015/0043139 | A1 * | 2/2015 | Myers | G06F 3/0412 |
| | | | | 361/679.3 |
| 2018/0247582 | A1 * | 8/2018 | Park | H04M 1/0266 |
| 2018/0343332 | A1 * | 11/2018 | Kim | G06F 1/1656 |

FOREIGN PATENT DOCUMENTS

| CN | 104506672 A | 4/2015 |
| CN | 206282179 U | 6/2017 |
| CN | 206775597 U | 12/2017 |
| TW | M545042 U | 7/2017 |

* cited by examiner

Primary Examiner — Anthony M Haughton
(74) Attorney, Agent, or Firm — ScienBiziP, P.C.

(57) ABSTRACT

An electronic device housed in glass or other fragile material which is nevertheless proofed against breakage includes a shell, a battery, and a display screen formed on one side of the battery and received in the shell. The shell comprises a glass back cover and a crack-proof layer. The crack-proof layer is formed on the glass back cover. The battery abuts the crack-proof layer. The display screen is assembled beside the battery. The display screen is received in and partially exposed to the shell. The battery is electronically connected to the display screen. The electronic device is protected within the glass back cover which is itself proofed against shock and breakage when dropped or impacted. The disclosure further provides a method for manufacturing the electronic device.

18 Claims, 5 Drawing Sheets

ELECTRONIC DEVICE AND METHOD FOR MANUFACTURING THE SAME

FIELD

The subject matter disclosed herein generally relates to an electronic device and a method for manufacturing the electronic device.

BACKGROUND

Many electronic devices use a glass shell as their shell. The glass shell is fragile and so cannot withstand rough handling or impacts.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
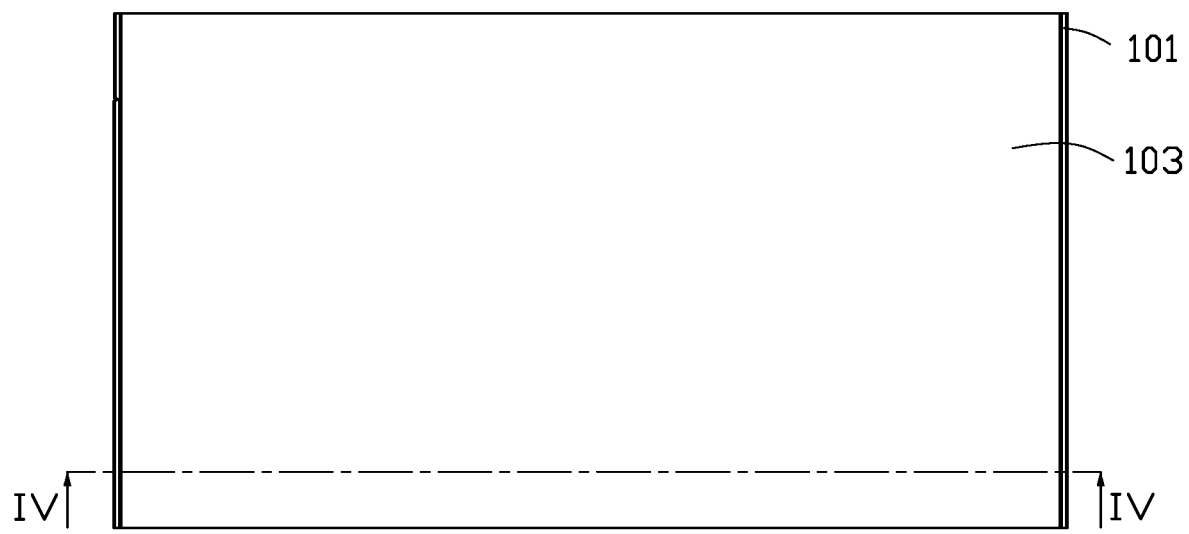
FIG. 1 is an isometric view showing an embodiment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIGS. 1-4 illustrate an electronic device 100. The electronic device 100 may be a mobile phone, a tablet, or a smart watch.

In at least one embodiment, the electronic device 100 is a mobile phone.

Figure 2:
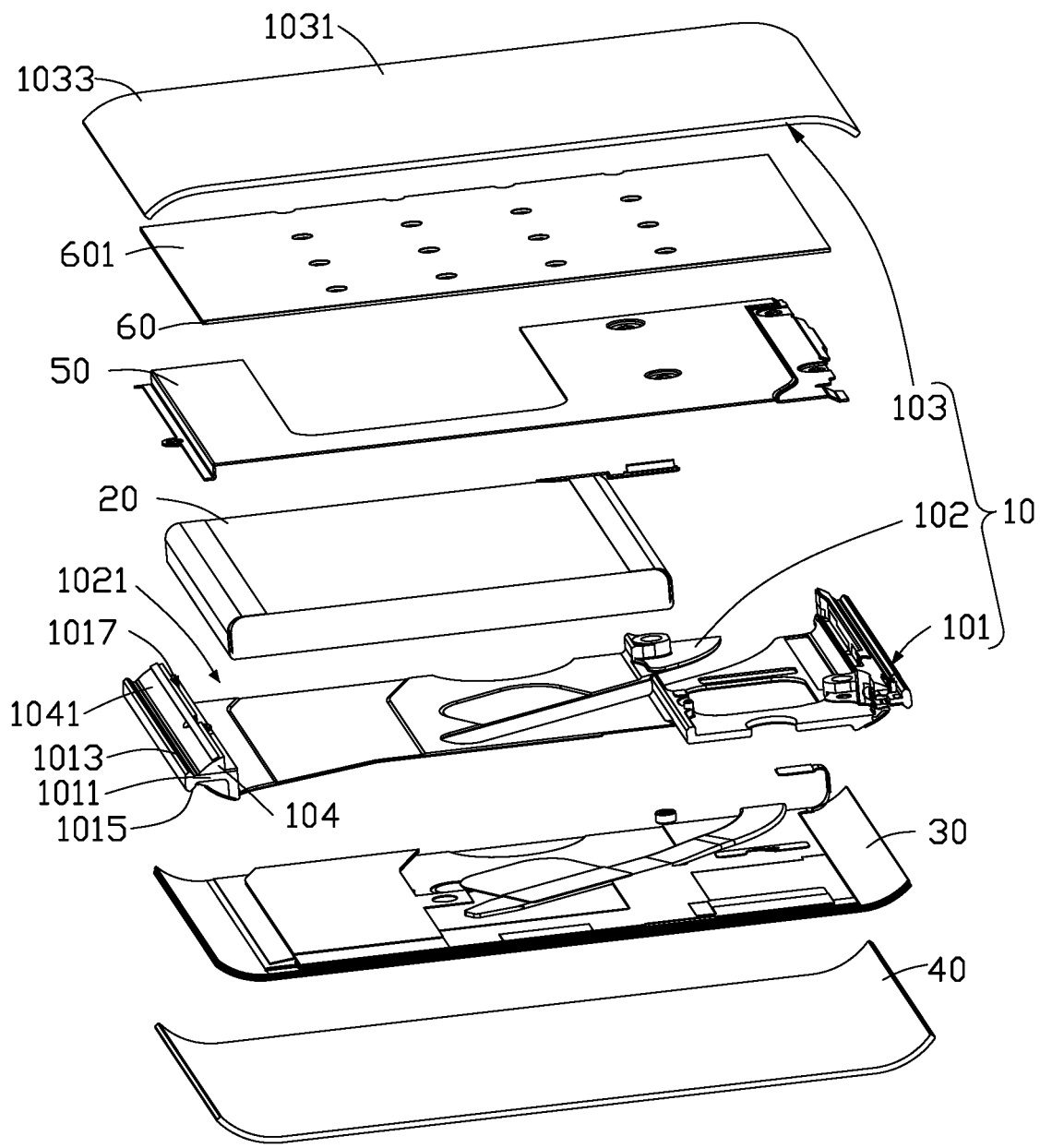
FIG. 2 is an exploded view of the electronic device in FIG. 1.
Figure 3:
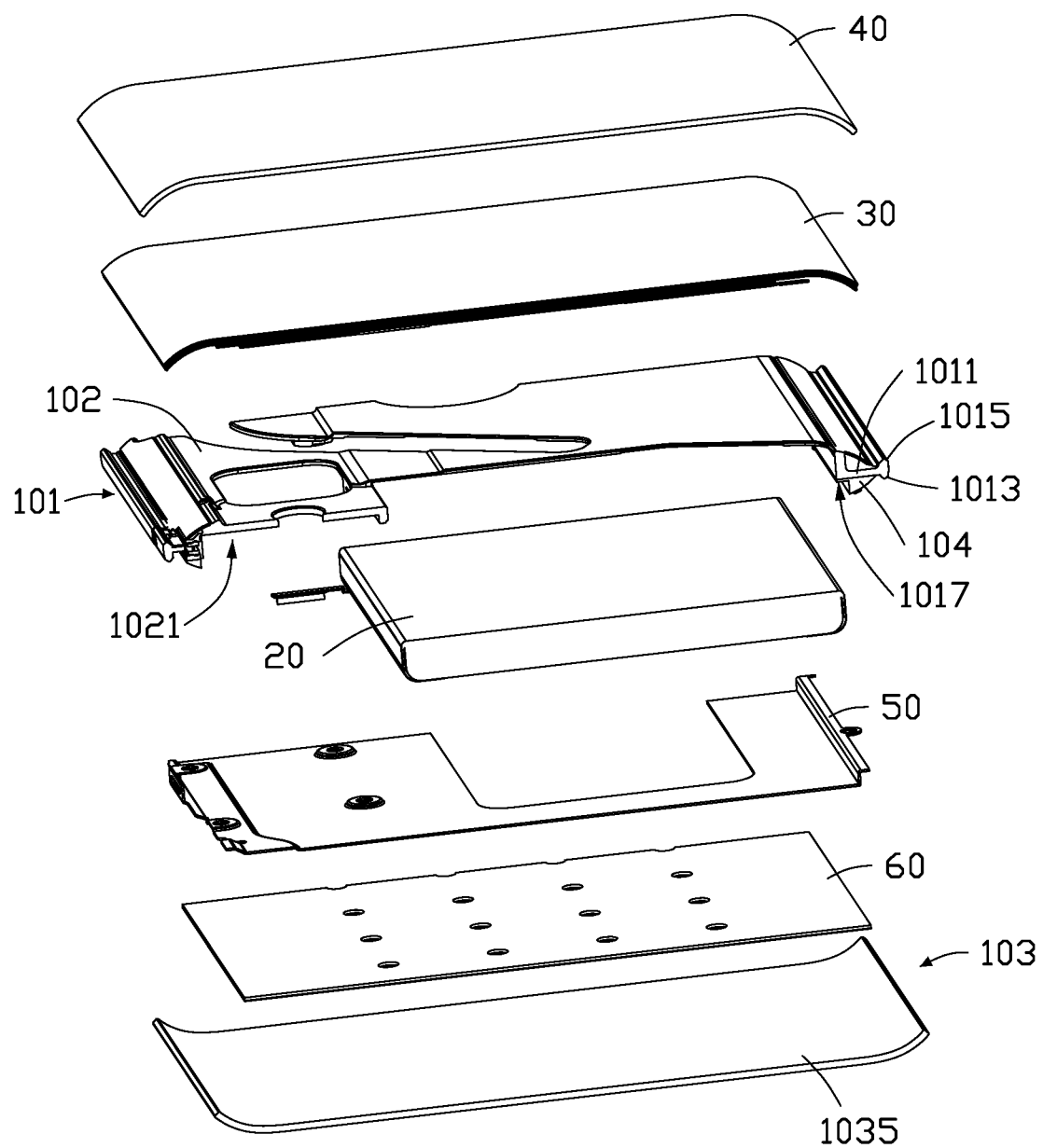
FIG. 3 is similar to FIG. 2, but viewed from another angle.

In FIGS. 1-3, the electronic device 100 includes a shell 10, a battery 20, and a display screen 30. The battery 20 is received in the shell 10. The display screen 30 is assembled beside the battery 20 and embedded in the shell 10. A portion of the display screen 30 is exposed from the shell 10 so as to be visible. The battery 20 is electronically connected to the display screen 30 and supplies electric power for the display screen 30.

The shell 10 includes a side frame 101, a middle frame 102, and a glass back cover 103.

In at least one embodiment, the side frame 101 is made of a metal material, such as stainless steel. The side frame 101 is a hollow frame structure. The side frame 101 includes a bottom plate 1011, a first protruding portion 1013, and a second protruding portion 1015. The first protruding portion 1013 is formed on one surface of the bottom plate 1011 and located on an edge of the bottom plate 1011. The second protruding portion 1015 is formed on another surface of the bottom plate 1011 opposite to the first protruding portion 1013. The second protruding portion 1015 is located at a junction of the bottom plate 1011 and the first protruding portion 1013.

In at least one embodiment, the side frame 101 has a thickness ranging from 2.3 millimeters to 2.5 millimeters. That is, a distance "T" from an end of the first protruding portion 1013 far away from the bottom plate 1011 to an end of the second protruding portion 1015 away from the bottom plate 1011 is from 2.3 millimeters to 2.5 millimeters.

An opening 1017 is defined at a middle portion of the bottom plate 1011. The opening 1017 runs through the bottom plate 1011.

In at least one embodiment, a cross-sectional surface of the middle frame 102 is U-shaped. The middle frame 102 is located in the opening 1017. The middle frame 102 includes at least two side walls 1022 and a bottom wall 1023. The two side walls 1022 are formed on the bottom wall 1023 and opposite to each other. The two side walls 1022 are connected to the bottom plate 1011. The bottom wall 1023 and a portion of the two side walls 1022 protrude out the bottom plate 1011. The two side walls 1022 and the bottom wall 1023 define a receiving groove 1021.

Figure 4:
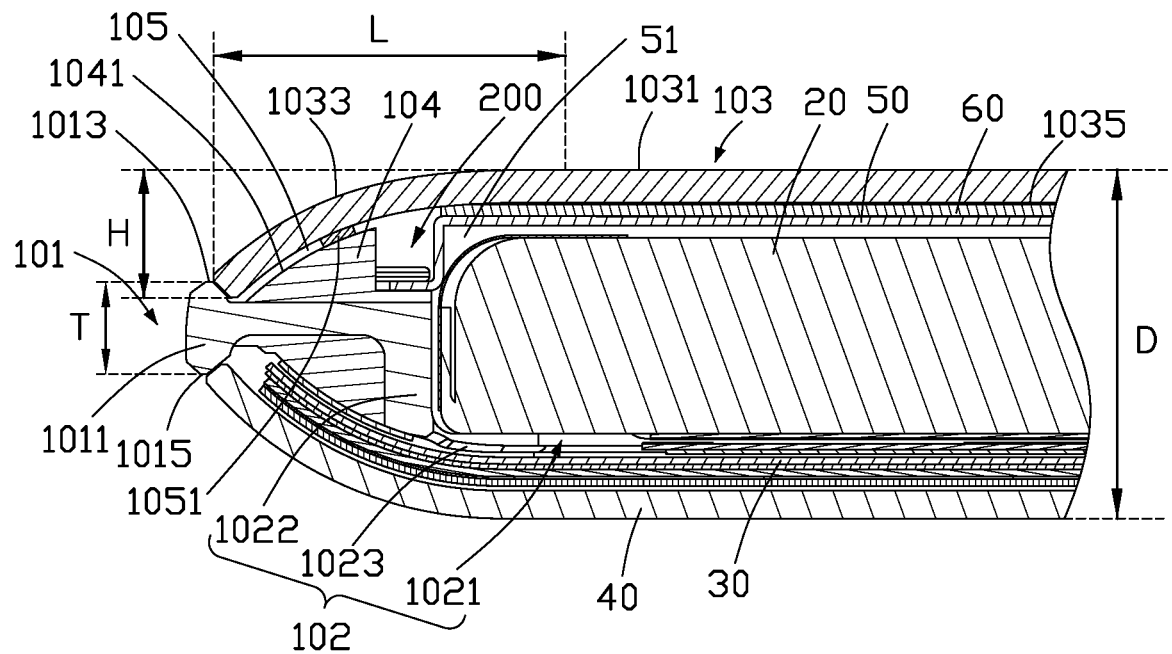
FIG. 4 is a cross-sectional view of the electronic device along line IV-IV of FIG. 1.

In FIG. 4, the glass back cover 103 is mounted on the side frame 101. The peripheral edge of the glass back cover 103 abuts the first protruding portion 1013 to define a housing space 200 together with the bottom plate 1011.

In at least one embodiment, the glass back cover 103 is a glass curved in three dimensions.

The glass back cover 103 includes a flat portion 1031 and a curved portion 1033. The curved portion 1033 is bent relative to the flat portion 1031 in a direction away from the flat portion 1031. A peripheral edge of the curved portion 1033 abuts the first protruding portion 1013 for assembly on the side frame 101. The curved portion 1033 abuts the on the first protruding portion 1013

The curved portion 1033 has a bent length "L" ranging from 6.3 millimeters to 6.6 millimeters and a bent depth "H" ranging from 3 millimeters to 3.3 millimeters. The bent length "L" is measured in a direction perpendicular to a direction of the bent depth "H".

In at least one embodiment, a crack-proof layer 1035 is defined on one surface of the glass back cover 103 towards the middle frame 102. The crack-proof layer 1035 reinforces the glass back cover 103 and prevents it from cracking and shattering.

In at least one embodiment, the crack-proof layer 1035 is formed by spraying an crack-proof paint on the surface of the glass back cover 103 toward the middle frame 102.

The crack-proof paint includes aqueous isocyanate resin, polyurethane resin, and pure water. The aqueous isocyanate resin has a mass percentage from 45% to 55% of the total mass of the crack-proof paint, the polyurethane resin has a mass percentage from 30% to 40% of the total mass of the crack-proof paint, and the pure water has a mass percentage from 5% to 25% of the total mass of the crack-proof paint.

The crack-proof layer 1035 has a thickness ranging from 0.03 millimeter to 0.05 millimeter.

The shell 10 further includes a connector 104 formed on the bottom plate 1011 and facing the glass back cover 103. The curved portion 1033 is bonded to the connector 104 by an adhesive layer 1051. The connector 104 is received in the housing space 200 as shown in FIG. 4.

The connector 104 includes a matching surface 1041 facing towards the glass back cover 103 A gap 105 is defined between the matching surface 1041 and the curved portion 1033 as shown in FIG. 4. The adhesive layer 1051 is filled in the gap 105 to bond the matching surface 1041 and the curved portion 1033, and further to assist in positioning the glass back cover 103 on the side frame 101.

In at least one embodiment, the connector 104 is made of plastic and can be formed on the bottom plate 1011 by injection molding or the like.

The display screen 30 is assembled on one surface of the middle frame 20 away from the battery 20. In at least one embodiment, the display screen 30 is a plastic organic light-emitting diode (POLED) display screen.

The electronic device 100 further includes a glass front cover 40 formed on the display screen 30. The peripheral edge of the glass front cover 40 abuts the second side portion 1015 of the side frame 101 to protect the display screen 30 as shown in FIG. 4.

In at least one embodiment, the glass front cover 40 is a glass curved in 3D.

In at least one embodiment, the glass front cover 40 has a thickness D ranging from 7.4 millimeters to 7.8 millimeters.

The electronic device 100 further includes a protecting shell 50 received in the housing space 200. The protecting shell 50 is located on the bottom plate 1011 and opposite to the middle frame 102. In at least one embodiment, the protecting shell 50 is U-shaped and includes a U-shaped opening 51 as shown in FIG. 4. The battery 20 is received in the U-shaped opening 51 and the receiving groove 1021 as shown in FIG. 4.

The electronic device 100 further includes a buffer layer 60 formed between the crack-proof layer 1035 and the protecting shell 50. The buffer layer 60 is formed on the crack-proof layer 1035 by a connecting layer 601 as shown in FIG. 2. The buffer layer 60 provides shock-absorbing function to the glass back cover 103 so that when the electronic device 100 is dropped, the buffering function further protects the glass back cover 103.

In at least one embodiment, the connecting layer 601 is an adhesive layer.

In at least one embodiment, the buffer layer 60 is made of foam.

Figure 5:
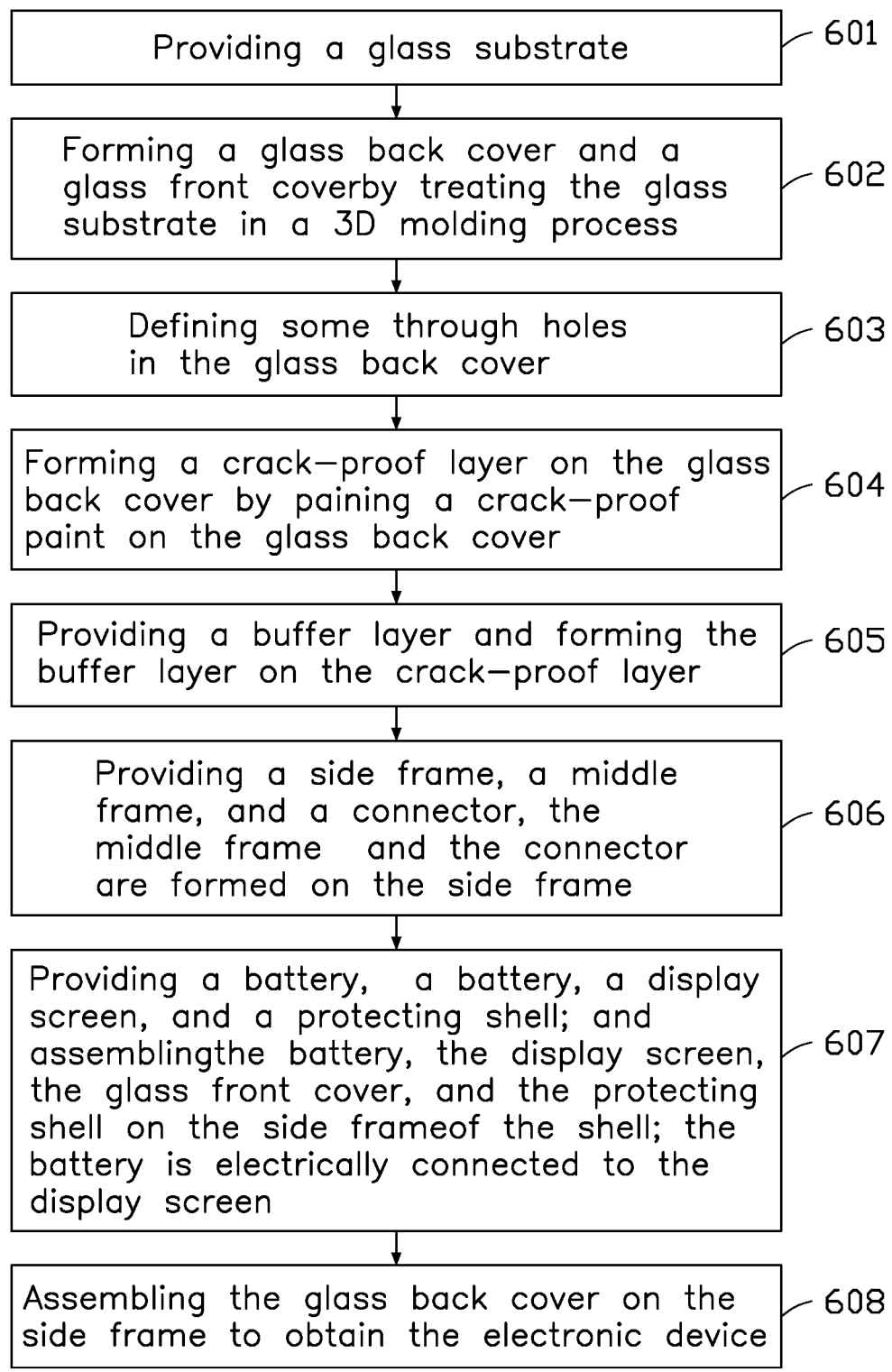
FIG. 5 is a flowchart for manufacturing the electronic device of FIG. 1.

FIG. 5 illustrates a flowchart of a method for manufacturing the electronic device 100. The method is provided by way of example, as there are a variety of ways to carry out the method. The method described below can be carried out using the configurations illustrated in FIG. 5, for example, and various elements of these figures are referenced in explaining example method. Each block shown in FIG. 5 represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 601.

At block 601, a glass substrate is provided.

At block 602, a glass back cover 103 and a glass front cover 40 are formed by treating the glass substrate in a 3D molding process.

In FIG. 4, the glass back cover 103 includes a flat portion 1031 and a curved portion 1033. The curved portion 1033 is formed by bending a peripheral edge of the flat portion 1031 in a direction away from the flat portion 1031. The curved portion 1033 has a bent length L that is from 6.3 millimeters to 6.6 millimeters and a bent depth H that is from 3 millimeters to 3.3 millimeters.

At block 603, some through holes (not shown) are defined in the glass back cover 103.

The through holes may be for a camera, for a finger print recognition, for the output of a flash, or the like.

In at least one embodiment, the through holes are formed by drilling.

At block 604, a crack-proof paint is painted on the glass back cover 103 and then heated to form a crack-proof layer 1035.

The crack-proof paint includes aqueous isocyanate resin, polyurethane resin, and pure water. The aqueous isocyanate resin has a mass percentage from 45% to about 55% of the total mass of the crack-proof paint, the polyurethane resin has a mass percentage from 30% to about 40% of the total mass of the crack-proof paint, and the pure water has a mass percentage from 5% to about 25% of the total mass of the crack-proof paint.

The crack-proof layer 1035 has a thickness ranging from 0.03 millimeter to 0.05 millimeter.

At block 605, a buffer layer 60 is provided and formed on the crack-proof layer 1035.

The buffer layer 60 is formed on the crack-proof layer 1035 by a connecting layer 601.

In at least one embodiment, the buffer layer 60 is foam.

In at least one embodiment, the connecting layer 601 is an adhesive layer.

At block 606, a side frame 101, a middle frame 102, and a connector 104 are provided, the middle frame 102 and the connector 104 are formed on the side frame 101.

The middle frame 102 includes at least two side walls 1022 and a bottom wall 1023. The two side walls 1022 are formed on the bottom wall 1023 and opposite to each other. The two side walls 1022 are connected to the bottom plate 1011. The bottom wall 1023 and a portion of the two side walls 1022 protrude out the bottom plate 1011. The two side walls 1022 and the bottom wall 1023 define a receiving groove 1021.

In at least one embodiment, the side frame 101 is made of a metal material, such as stainless steel. The side frame 101 is a hollow frame structure. The side frame 101 includes a bottom plate 1011, a first protruding portion 1013, and a second protruding portion 1015. The first protruding portion 1013 is formed on one surface of the bottom plate 1011 and lies on an edge of the bottom plate 1011. The second protruding portion 1015 is formed on another surface of the bottom plate 1011 opposite to the first protruding portion 1013. The second protruding portion 1015 is located at a junction of the bottom plate 1011 and the second protruding portion 1015. An opening 1017 is defined in a middle portion of the bottom plate 1011. The opening 1017 runs through the bottom plate 1011.

In at least one embodiment, a cross-sectional surface of the middle frame 102 is U-shaped.

The connector 104 is formed on the bottom plate 1011 and faces the glass back cover 103. The curved portion 1033 is bonded to the connector 104 by an adhesive layer 1051. The connector 104 is received in the housing space 200 as shown in FIG. 4.

The connector 104 includes a matching surface 1041 facing towards the glass back cover 103 A gap 105 is defined between the matching surface 1041 and the curved portion 1033 as shown in FIG. 4. The adhesive layer 1051 is filled in the gap 105 to bond the matching surface 1041 and the curved portion 1033, and further to assist in positioning the glass back cover 103 on the side frame 101.

At block 607, a battery 20, a display screen 30, and a protecting shell 50 are provided; the battery 20, the display screen 30, the glass front cover 40, and the protecting shell 50 being assembled on the side frame 101 of the shell 10, the battery 20 is electrically connected to the display screen 30.

The display screen 30 is assembled on one surface of the middle frame 20 away from the receiving groove 1021. The glass front cover 40 is formed on the display screen 30 and touches the second protruding portion 1015 of the side frame 101. The battery 20 is received in the receiving groove 1021. The protecting shell 50 is formed on the bottom plate 1011 to fix the battery 20. An adhesive layer 1051 is filled into the gap 105 to bond the matching surface 1041 and the curved portion 1033, and further to assist the positioning of glass back cover 103 on the side frame 101.

At block 608, the glass back cover 103 is assembled on the side frame 101 to obtain the electronic device 100.

The glass back cover 103 is assembled on the side frame 101 by the adhesive layer 1051.

The buffer layer 60 abuts the protecting shell 50. A peripheral edge of the curved portion 1033 abuts the first protruding portion 1013 and the curved portion 1033 abuts the adhesive layer 1051 to assemble the glass back cover 103 on the side frame 101.

With the above configuration, the electronic device 100 includes a shell 10. The shell 10 includes a glass back cover 103. A crack-proof layer 1035 is formed on an inner surface of the glass back cover 103. Further, a buffer layer 60 is formed on the crack-proof layer 1035 for shock-absorption purposes.

The embodiments shown and described above are only examples. Many details are often found in the art such as the other features of an electronic device and a method for manufacturing the electronic device. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. An electronic device, comprising:
   a shell, wherein the shell comprises a glass back cover and a crack-proof layer, the crack-proof layer is formed on the glass back cover; the crack-proof layer is made of a crack-proof paint formed on a surface of the glass back cover, the crack-proof paint comprises aqueous isocyanate resin, polyurethane resin, and pure water; the aqueous isocyanate resin has a mass percentage from 45% to 55% of the total mass of the crack-proof paint, the polyurethane resin has a mass percentage from 30% to 40% of the total mass of the crack-proof paint, and the pure water has a mass percentage from 5% to 25% of the total mass of the crack-proof paint;
   a battery received in the shell and abutting the crack-proof layer; and
   a display screen, wherein the display screen is assembled beside the battery, the display screen is received in and partially exposed to the shell, and the battery is electronically connected to the display screen.

2. The electronic device of claim 1, wherein the glass back cover comprises a flat portion and a curved portion, the curved portion is formed by bending a peripheral edge of the flat portion in a direction away from the flat portion; the curved portion has a bent length ranging from 6.3 millimeters to 6.6 millimeters and a bending depth from 3 millimeters to 3.3 millimeters.

3. The electronic device of claim 2, wherein the shell further comprises a side frame, the side frame comprises a bottom plate and a first protruding portion, the first protruding portion is formed on one surface of the bottom plate and located on an edge of the bottom plate, a peripheral edge of the curved portion abuts the first protruding portion.

4. The electronic device of claim 3, wherein the shell further comprises a connector formed on the bottom plate and facing the glass back cover, the curved portion is bonded to the connector, the connector comprises a matching surface facing towards the curved portion, a gap is defined between the matching surface and the curved portion, the adhesive layer is filled in the gap to bond the matching surface and the curved portion.

5. The electronic device of claim 4, wherein an opening is defined at a middle portion of the bottom plate, the opening runs through the bottom plate, the shell further comprises a middle frame, the middle frame is located in the opening, the middle frame comprises at least two side walls and a bottom wall, the two side walls are formed on the bottom wall and opposite to each other; the two side walls are connected to the bottom plate; the bottom wall and a portion of the two side walls protrude out the bottom plate; the two side walls and the bottom wall define a receiving groove, the battery is received in the receiving groove.

6. The electronic device of claim 3, wherein the electronic device further comprises a glass front cover formed on a surface of the display screen away from the side frame, the side frame comprises a second protruding portion, the second protruding portion is formed on another surface of the bottom plate opposite to the first protruding portion, and the second protruding portion is located at a junction of the bottom plate and the first protruding portion, a peripheral edge of the glass front cover abuts the second side portion of the side frame to protect the display screen.

7. The electronic device of claim 3, wherein the side frame is made of stainless steel.

8. The electronic device of claim 5, wherein the electronic device further comprises a protecting shell formed on the bottom plate and a buffer layer formed on the crack-proof layer, the protecting shell is between the glass back cover and the middle frame to protect the battery, the buffer layer abuts the protecting shell.

9. The electronic device of claim 1, wherein the crack-proof layer has a thickness ranging from 0.03 millimeter to 0.05 millimeter.

10. The electronic device of claim 4, wherein a peripheral edge of the glass back cover with the first protruding portion and the bottom plate define a housing space, the connector is received in the housing space.

11. The electronic device of claim 6, wherein the glass front cover has a thickness ranging from 7.4 millimeters to 7.8 millimeters.

12. A method for manufacturing an electronic device, comprising:
providing a glass substrate;
forming a glass back cover by treating the glass substrate in a 3D molding process;
forming a crack-proof layer on the glass back cover by paining a crack-proof paint on the glass back cover; wherein the crack-proof paint comprises aqueous isocyanate resin, polyurethane resin, and pure water; the aqueous isocyanate resin has a mass percentage from 45% to about 55% of the total mass of the crack-proof paint, the polyurethane resin has a mass percentage from 30% to about 40% of the total mass of the crack-proof paint, and the pure water has a mass percentage from 5% to about 25% of the total mass of the crack-proof paint;
providing a side frame;
providing a battery and a display screen, and assembling the battery and the display screen on the side frame; wherein the battery is electrically connected to the display screen; and
assembling the glass back cover on the side frame.

13. The method of claim 12, wherein the glass back cover comprises a flat portion and a curved portion, the curved portion is formed by bending a peripheral edge of the flat portion in a direction away from the flat portion.

14. The method of claim 13, wherein the side frame comprises a bottom plate, when providing the side frame, a middle frame and a connector are provided, the middle frame and the connector are formed on the side frame, an opening is defined in a middle portion of the bottom plate, the middle frame is located in the opening, the curved portion faces the glass back cover and is bonded to the connector by an adhesive layer; the connector towards the glass back cover and is opposite to the curved portion, the connector comprises a matching surface facing towards the glass back cover, the matching surface matches the curved portion, the adhesive layer is formed on the matching surface.

15. The method of claim 14, wherein before assembling the glass back cover on the shell by the adhesive layer, further comprising:
providing a protecting shell and forming the protecting shell on the bottom plate to fix the battery.

16. The method of claim 12, wherein after forming a crack-proof layer on the glass back cover, further comprises:
providing a buffer layer and forming the buffer layer on the crack-proof layer.

17. The method of claim 12, wherein when forming the glass back cover, a glass front cover is formed by treating the glass substrate in a 3D molding process, when assembling the battery and the display screen on the side frame, the glass front cover is assembled on the display screen and touches side frame.

18. The method of claim 12, wherein after forming a glass back cover, further comprises:
defining some through holes in the glass back cover.

* * * * *